United States Patent [19]

Gundersen

[11] 4,036,126
[45] July 19, 1977

[54] DEVICE FOR STAMPING SOIL INTO GROUPS OF GROWTH POTS

[75] Inventor: Marius Gundersen, Larvik, Norway
[73] Assignee: Vefi A/S, Norway
[21] Appl. No.: 662,310
[22] Filed: Mar. 1, 1976

[30] Foreign Application Priority Data
Mar. 5, 1975 Norway .................................. 750739

[51] Int. Cl.² .......................... B30B 3/02; B30B 9/00; B65B 1/24
[52] U.S. Cl. ..................................... 100/210; 47/1 A; 53/124 B; 100/299; 141/80; 172/350; 172/554; 404/131; 425/458
[58] Field of Search ................ 47/1, 34.13, 37; 111/1, 111/2, 90, 92, 99, 91; 172/349, 350, 540, 548, 554; 404/121, 131; 141/80, 73; 100/210, 299, 229 R, 265; 53/124 B; 7/13.1; 425/412, 458, 374

[56] References Cited

U.S. PATENT DOCUMENTS

| 517,352 | 3/1894 | Maxwell | 172/554 X |
| 670,874 | 3/1901 | Hall | 172/554 X |
| 1,257,818 | 2/1918 | Dixon | 172/554 |
| 2,176,984 | 10/1939 | Adkinson | 172/548 |

FOREIGN PATENT DOCUMENTS

| 1,009,742 | 6/1952 | France | 47/1 |
| 886,397 | 7/1953 | Germany | 172/554 |
| 244,386 | 8/1909 | Germany | 172/554 |
| 66,136 | 6/1950 | Netherlands | 172/554 |
| 55,100 | 7/1930 | Norway | 47/37 |
| 599,962 | 3/1948 | United Kingdom | 47/37 |

Primary Examiner—Edgar S. Burr
Assistant Examiner—Steven A. Bratlie
Attorney, Agent, or Firm—Ladas, Parry, Von Gehr, Goldsmith & Deschamps

[57] ABSTRACT

A device for stamping soil into groups of growth pots positioned in abutting relationship on a table or the like, which device comprises a roller means provided with longitudinally and circumferentially evenly spaced stamping pegs, the spacing between each peg exactly corresponding to the spacing between the pots on the table, said roller means rotatably supported in a holder and said holder provided with a rodlike handle means.

1 Claim, 2 Drawing Figures

DEVICE FOR STAMPING SOIL INTO GROUPS OF GROWTH POTS

The present invention relates to a device for simultaneous stamping of soil into groups of pots.

The invention is developed in connection with small growth pots made in lightweight plastics of the kind which has come into wide use in the horticulture and gardening industry. Thus, a medium sized horticulture is daily handling thousands or ten-thousands of such growth pots in connection with the plant production. A quick, correct and effective handling of the pots is obviously of decisive importance for the economy. An important step in the production is the filling of soil into the pots. In the later years has therefore been developed various sorts of equipment for mechanical handling of the pots, including filling and stamping soil therein. With such equipment it is possible without manual labour to fill and stamp soil into the pots. This usually takes place while the pots are positioned in large groups side by side on a table or when the pots are positioned in particular trays provided with special receiving openings for each individual pot. Known equipment for this purpose is burdened with severe drawbacks. Thus, it is complicated and expensive, and further it is space consuming and still not sufficiently effective in use. A special drawback with such equipment is that it is inherently more or less stationary located, having the consequence that the pots must be moved to the machine for filling and not the opposite way, a fact which makes it very cumbersome to use it, visualizing that thousands of pots are spread along large tables.

As mentioned, the pots are usually positioned side by side in large groups on a table. The pots have suitably square shape such that the pots when positioned side by side are completely filling out the table space. Along the edges of the table are usually arranged fences forming a support for the pots. If not utilizing a special soil filling machine, such large groups of pots may be roughly filled with soil by pouring thereon a large lump of soil, whereupon surplus soil is distributed and swept off by moving a sweeper or straight edge stripper along the top edges of the pots, thereby filling the pots with soil to the top of same. A such sweeper means can extend from one side of the table to the other and can be mechanically moved therealong such that surplus soil is dumped off at the end of the table. However, thereafter it is necessary to stamp down the soil in each individual pot, and visualizing that one table may contain several thousands of growth pots it is easily visualized that the stamping operation can be very cumbersome. In this connection it shall be noted that it is of great importance for the plant growth that the stamping is carried out evenly with a predetermined soil compression.

As mentioned above, there has been developed complicated equipment to carry out this stamping operation, but it is hampered with the mentioned drawbacks.

The object of the present invention is thus to provide a simple and effective device for stamping soil in growth pots and the like, which pots to be used in connection with growth pots are positioned in pluralities adjacently side by side on a table, preferably rectangular growth pots thus covering the entire surface of said table, the pots being filled with soil, the subsequent stamping of the soil into each pot being carried out with a stamping means, and the present invention is characterized in that said stamping means comprises a roller means provided with longitudinally and circumferentially evenly spaced stamping pegs, the spacing between each peg exactly corresponding to the spacing between the pot on the table, said roller means rotatably supported in a holder and said holder provided with a rodlike handle means.

At this point it shall be mentioned that there is known some agricultural implements with a wheel provided with circumferentially spaced pegs carrying out a sort of stamping of soil-filled pots and is driven thereby. The speed of the wheel is adjusted to the speed of the pots moved along a conveyor belt or the like below the wheel, but the known implement is complicated and does not solve the problem of obtaining accurate centered stamping of the soil in the pots and is otherwise hampered with the drawbacks outlined above.

Through the device in accordance with the invention one is ensured correct positioning or calibrating of the pegs, since when first positioning one row of pegs into a complementary row of pots the means will adjust and position itself while being rolled along the pots, row after row.

It shall furthermore be mentioned that growth pots of the particular type used in particular are made of very thin-walled fragile plastics and if the stamping means is not exactly centered into the pots but are instead touching or hitting the edge, the pot will immediately collapse and in most cases fracture.

By configurating the pegs on the roller means to suit the opening of the pots one can obtain the desired positioning and stamping, and by providing the roller means with suitable weight one can obtain the desired degree of soil compression.

The invention shall be further described with reference to the accompanying drawing showing a preferred embodiment of the invention, wherein:

FIG. 1 is a side view illustrating the roller means in operation, while

Figure 2:
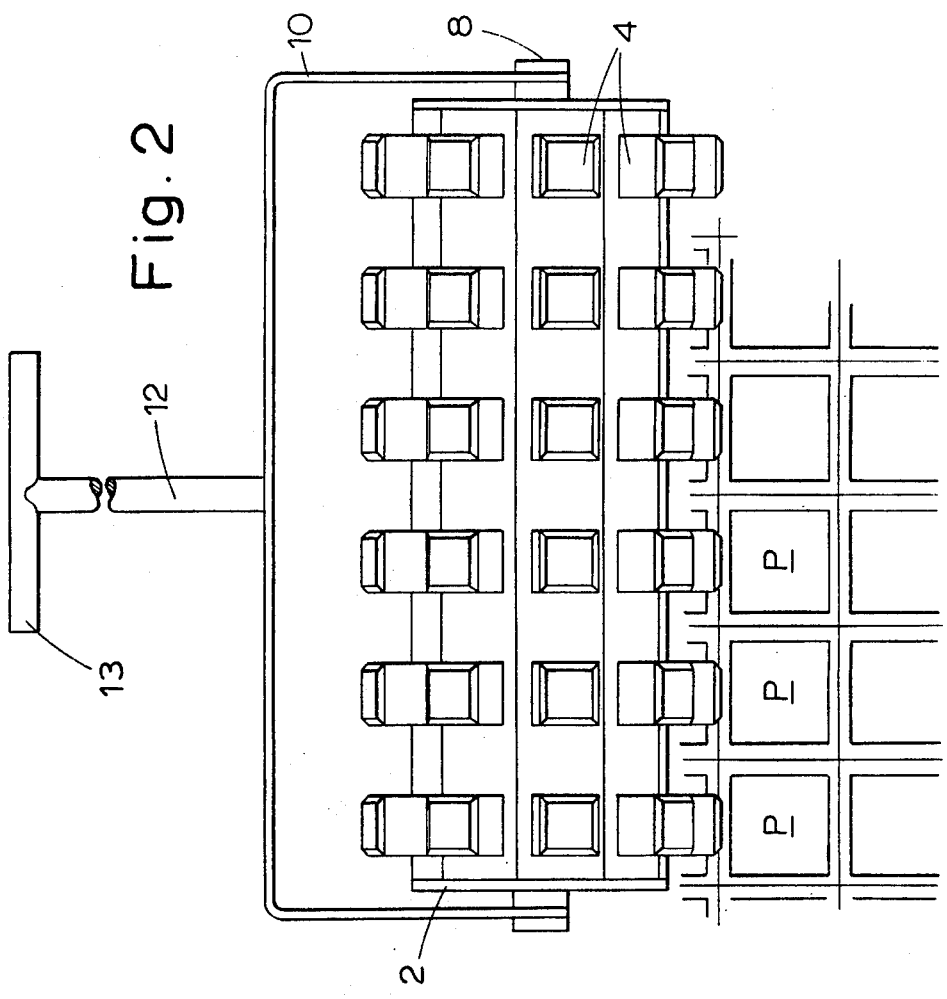
FIG. 2 is showing a plan view of the roller means together with a below positioned group of pots.
Figure 1:
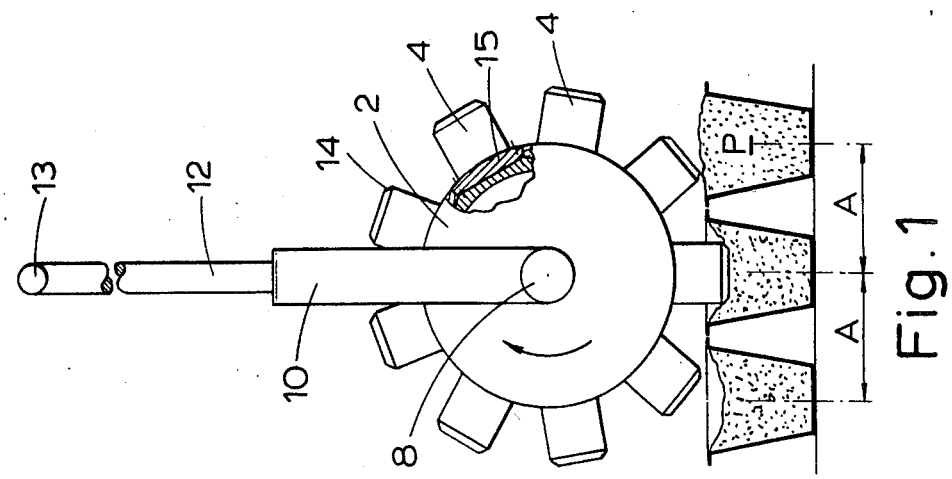

As it appears from the Figures, the device comprises a substantially cylindrical roller means 2 which around the circumference is provided with pegs 4,4 etc. evenly distributed longitudinally as well as circumferentially around the roller such that all pegs have equal mutual distance or pitch. This pitch conforms exactly to the linear distance between each individual growth pot P, such as illustrated in the Figures. The size and configuration of each peg must be adapted to the pots and to the kind of soil used and should generally correspond to the size of the pots. Such growth pots have usually square shape and the pegs should therefore also have square shape and should have abutted or flat front face in order to provide the desired even stamping of the soil simultaneously as the pegs should provide sufficient supporting surface. To facilitate the entry of the pegs into the pots they should have bevelled edges 14. The roller means 2 is rotatably supported on tap shafts or a spindle shaft 8 which further is supported in a yoke means 10 provided with a stem 12 having a handle 13. In use the device is positioned upon the table covered with adjacently positioned growth pots simultaneously as the user controls that one row of pegs on the roller means is positioned down into one complementary row of pots forming part of a large surface or group of pots filled with soil. Due to the weight of the roller means the pegs will sink down somewhat and compress the soil in a suitable fashion. In this position the roller means can simply be rolled along the table having consequence that row after row of pegs will be positioned in subsequent rows of pots and thereby compress the soil therein, the preceding row always serving as positioning means for the next row. It will be understood that the movement of the roller means must be linear and transverse relative to the rows of pots. During this action the pegs will seat themselves centrally in each row of pots and the pegs are laterally supported by the compressed soil which more or less surrounds the pegs. When the roller means has been moved along a suitable number of rows, it can be lifted up and may thereafter for instance be rolled in a direction perpendicular to the first direction in order to further compress the soil, or it can be lifted up and moved sideways and rolled in a direction parallel to the first direction to stamp the soil in a new laterally positioned group of pots. In this fashion the soil in thousands of pots can be suitably stamped in a very short time. The roller means is given a suitable weight to obtain the desired compression of the soil. The roller can be given increased weight by putting weights thereon. However, when making the roller for instance from a steel piping or wood, the roller means will attain a suitable weight. To facilitate the entry of the pegs into the pots and provide a certain wedging of same to encrease the positioning effect, the edges of the pegs may as mentioned be bevelled off as shown at 14. The characteristics of the soil used may differ depending on what kind of plants shall be produced. This may cause a need for varying the configuration and type of the pegs. In order to make the pegs replacable, they are conveniently mounted on longitudinal ledges 15 which again may be attached to the roller means with screw bolts or the like.

In the drawing is shown an embodiment suitable for regular manual use and comprising twelve longitudinal rows of pegs each provided with six pegs. Certainly the size of the device can be varied in accordance with the need. It is also fully possible to more or less mechanize the use of the device by supporting the roller means in a frame which can be mechanically moved along the table. Practice, however, has shown that the manual version as shown suffices most needs.

I claim:

1. A device for tamping soil in groups of stationary soil-filled growth pots positioned in evenly spaced side by side relationship comprising a cylindrical roller rotatably supported in a holder having a rodlike handle at its end opposite said roller, said roller including longitudinally and circumferentially evenly spaced tampering projections, the longitudinal and circumferential spacing between the center of the outer surface of each adjacent projection being equal and corresponding to the spacing between the centers of any of said adjacent pots, each projection having a cross-sectional shape substantially conforming to the shape of the opening of said pots, the outer end of each projection being substantially flat and having a bevelled edge around the perimeter thereof to facilitate the entrance of the projection into the open end of said pots to tamp the soil therein, said projections which are in longitudinal alignment being affixed to a supporting plate and said supporting plate being secured to said roller.

* * * * *